(12) United States Patent
Kritter et al.

(10) Patent No.: US 10,439,325 B2
(45) Date of Patent: Oct. 8, 2019

(54) SWIVELLING LEVER ARRANGEMENT FOR HOUSING ARRANGEMENT

(71) Applicant: Stäubli Electrical Connectors AG, Allschwil (CH)

(72) Inventors: Denis Kritter, Raedersdorf (FR); Michel Windenberger, Lutterbach (FR)

(73) Assignees: Multi-Holding AG, Allschwil (CH); Stäubli Electrical Connectors AG, Allschwil (CH)

( * ) Notice: Subject to any disclaimer, the term of this patent is extended or adjusted under 35 U.S.C. 154(b) by 793 days.

(21) Appl. No.: 14/886,294

(22) Filed: Oct. 19, 2015

(65) Prior Publication Data

US 2016/0108940 A1     Apr. 21, 2016

(30) Foreign Application Priority Data

Oct. 20, 2014   (EP) .................................. 14189596

(51) Int. Cl.
*H01R 13/629*   (2006.01)
*F16B 2/18*     (2006.01)

(52) U.S. Cl.
CPC .  *H01R 13/62966* (2013.01); *H01R 13/62938* (2013.01); *F16B 2/185* (2013.01)

(58) Field of Classification Search
CPC ........ H01R 13/62955; H01R 13/62938; H01R 13/62966
See application file for complete search history.

(56) References Cited

U.S. PATENT DOCUMENTS

| 5,328,377 | A | * | 7/1994 | Saito | ................ | H01R 13/62938 |
| | | | | | | 439/157 |
| 5,393,238 | A | * | 2/1995 | Saito | ................ | H01R 13/62938 |
| | | | | | | 439/157 |
| 5,401,179 | A | * | 3/1995 | Shinchi | ............ | H01R 13/62933 |
| | | | | | | 439/157 |
| 5,427,539 | A | * | 6/1995 | Saito | ................ | H01R 13/62933 |
| | | | | | | 439/157 |
| 5,474,462 | A | * | 12/1995 | Yamanashi | ...... | H01R 13/62933 |
| | | | | | | 439/153 |

(Continued)

FOREIGN PATENT DOCUMENTS

| EP | 2451021 A2 | 5/2012 |
| GB | 2327155 A | 1/1999 |
| JP | 2004311190 A | 11/2004 |

*Primary Examiner* — Matthieu F Setliff
(74) *Attorney, Agent, or Firm* — The Webb Law Firm

(57) ABSTRACT

A swivelling lever arrangement (3) for securing a housing arrangement (1) has at least of a first and a second housing part (11,12). The swivelling lever arrangement (3) has at least one swivelling lever (4) and a guiding pin (2). The swivelling lever (4) has a receptacle (8). The swivelling lever (4) and the guiding pin (2) are attachable on the housing parts (11,12) such that, when the swivelling lever (4) swivels from a release position into a locking position when the housing parts (11,12) are substantially brought together, the guiding pin (2) is receivable in the receptacle (8). The receptacle (8) has at least one cam (74) designed such that, when the swivelling lever (4) swivels, the guiding pin (2) is guided into a depth (84) of the receptacle (8) via the cam (74) such that part of the head portion (41) is deflected by the cam (74).

27 Claims, 6 Drawing Sheets

(56) References Cited

U.S. PATENT DOCUMENTS

| | | | | |
|---|---|---|---|---|
| 5,476,391 A * | 12/1995 | Katsuma | H01R 13/62933 | 439/155 |
| 5,509,816 A * | 4/1996 | Katsuma | H01R 13/62938 | 439/153 |
| 5,658,162 A * | 8/1997 | Harting | H01R 13/62966 | 439/157 |
| 5,672,067 A | 9/1997 | Ryll et al. | | |
| 6,905,355 B2 | 6/2005 | Fukamachi | | |
| 7,335,038 B2 * | 2/2008 | Duval | H01R 13/62938 | 439/157 |
| 7,407,397 B2 * | 8/2008 | Fukatsu | H01R 13/62938 | 439/157 |
| 7,513,784 B2 * | 4/2009 | Shibata | H01R 13/62938 | 439/157 |
| 7,717,723 B2 * | 5/2010 | Nehm | H01R 13/62966 | 439/157 |
| 7,785,131 B2 * | 8/2010 | Ferderer | H01R 13/62933 | 439/157 |
| 7,942,688 B2 * | 5/2011 | Ferderer | H01R 13/62966 | 439/372 |
| 8,033,844 B2 * | 10/2011 | Kobayashi | H01R 13/62955 | 439/157 |
| 8,496,489 B2 * | 7/2013 | Takatsu | H01R 13/62938 | 439/157 |
| 2003/0199185 A1 * | 10/2003 | Fujii | H01R 13/506 | 439/157 |
| 2006/0270257 A1 * | 11/2006 | Duval | H01R 13/62938 | 439/157 |
| 2007/0207648 A1 * | 9/2007 | Fukatsu | H01R 13/62938 | 439/157 |
| 2008/0248664 A1 * | 10/2008 | Shibata | H01R 13/62938 | 439/157 |
| 2009/0258530 A1 * | 10/2009 | Nehm | H01R 13/62955 | 439/372 |
| 2010/0248513 A1 * | 9/2010 | Ferderer | H01R 13/62955 | 439/157 |
| 2011/0053405 A1 * | 3/2011 | Kobayashi | H01R 13/62955 | 439/345 |
| 2011/0271507 A1 * | 11/2011 | Takatsu | H01R 13/62938 | 29/428 |
| 2012/0115346 A1 | 5/2012 | Zwanger | | |
| 2012/0202376 A1 * | 8/2012 | Shiga | H01R 13/62938 | 439/533 |
| 2013/0316599 A1 * | 11/2013 | Goldschmidt | H01R 11/282 | 439/782 |

* cited by examiner

SWIVELLING LEVER ARRANGEMENT FOR HOUSING ARRANGEMENT

CROSS-REFERENCE TO RELATED APPLICATION

This application claims priority to European Patent Application No. 14 189 596.1 filed Oct. 20, 2014, the disclosure of which is hereby incorporated in its entirety by reference.

BACKGROUND OF THE INVENTION

Field of the Invention

The present invention relates to a swivelling lever arrangement for securing a housing arrangement consisting of at least one first and one second housing part, wherein the housing parts can be brought together along a connecting movement.

Description of Related Art

Swivelling lever arrangements for securing a plug-in housing arrangement and consisting of a swivelling lever and a guiding pin are known. The swivelling lever is mounted in a swivelling manner on the one housing part and the guiding pin is secured on the other housing part. The lever has a receptacle for the pin. Lever and pin are then designed and arranged in such a manner that the lever can be swivelled from a starting position into an end position and, in the process, receives the pin in a recess and therefore secures the two housing parts to each other.

SUMMARY OF THE INVENTION

It is an object of the present invention to specify a swivelling lever arrangement which permits improved securing of the two housing parts to each other.

This object is achieved by a swivelling lever arrangement according to claim 1. According thereto, a swivelling lever arrangement for securing a housing arrangement consisting of at least one first and one second housing part is proposed. The housing parts can be brought together along a connecting movement, i.e., for example, can be joined or plugged together. The swivelling lever arrangement has at least one swivelling lever, preferably two or more swivelling levers. Said swivelling levers can be coupled to opposite sides of the first housing part. Furthermore, the swivelling lever arrangement has at least one guiding pin. The swivelling lever is preferably a two-armed lever, and the guiding pin is a bolt- or peg-shaped abutment for the lever. The swivelling lever is couplable in a swivelling manner to the first housing part, and the guiding pin is attachable to the second housing part. Swivelling lever and guiding pin are therefore fastened to opposite housing parts which are to be connected. The swivelling lever has a lever portion with a proximal end and a distal head portion. The distal direction is therefore the direction from the proximal end to the distal head portion of the swivelling lever. The swivelling lever is preferably couplable to the first housing part via a coupling point in the head portion. The head portion furthermore has a receptacle, wherein the swivelling lever and the guiding pin are attachable on the respective housing parts in such a manner that, when the swivelling lever swivels from a release position into a locking position when the housing parts are substantially brought together, the guiding pin is receivable in the receptacle. The swivelling lever and the guiding pin are therefore corresponding elements which can be brought into engagement with each other.

The swivelling lever arrangement according to the invention is distinguished in particular in that the receptacle has at least one cam which is arranged and designed in such a manner that, when the swivelling lever swivels from said release position into said locking position, the guiding pin is guided into a depth of the receptacle and, in the process, is guided via the cam in such a manner that part of the head portion is deflected by the cam.

The receptacle is preferably furthermore configured in such a manner that the guiding pin is guided deeper into the receptacle on the way towards the locking position and, in the process, the deflected part then at least partially springs back again. The guiding pin can thus be received in a free-from-play manner and can be blocked on the depth side of the cam. The spring leg and the guiding pin are preferably designed here in such a manner that the springing-back spring leg does not completely spring back, and therefore the spring leg pulls together the housing parts resiliently via the pin. The spring leg is therefore designed, and the pin arranged in such a manner that, when the lever is in the locking position, the spring leg springs onto the pin, and therefore the pin is pretensioned towards the axis of rotation of the lever. This improves a seal between the locked housing parts. The spring leg preferably receives the pin in a substantially form-fitting manner in the receiving region, i.e. the receiving region is only 0.1 millimeter to 1.3 millimeter larger than the pin.

The invention is therefore based on the realization that a cam-actuated, resilient portion of the head portion can provide additional closure security by means of a clamping grip on the guiding pin. The locking is therefore protected, for example, against vibration, as can occur, for example, if the coupling is mounted on a moving train or lorry.

The swivelling lever is preferably formed as a single piece, in particular from stainless steel. The lever is preferably a flat component composed of a sheet material having a constant material thickness.

The head portion of the swivelling lever preferably has a bearing leg running in the distal direction and a spring leg opposite the bearing leg at a distance therefrom. The swivelling lever is preferably couplable by the bearing leg to the first housing part. A distal portion of the bearing leg therefore forms part of the one lever arm, and the proximally adjoining lever part forms the other lever arm.

The bearing leg can have a bearing leg edge directed towards the spring leg, and the spring leg can have a spring leg edge directed towards the bearing leg edge. The sheet-like portion of the end side, i.e. that portion of the element which is perpendicular to the flat side, is meant here as the edge. The receptacle is then preferably delimited by the bearing leg edge and the spring leg edge, i.e. the receptacle is formed between the bearing leg edge and the spring leg edge of the spring leg. The head portion preferably has a larger diameter than the lever portion. As a transition portion between head portion and lever portion, a neck portion which smoothly adapts the material diameter (along the flat side) is provided. The cam is preferably fastened to the spring leg edge and protrudes from the spring leg edge into the receptacle. The cam therefore protrudes at an angle to or transversely with respect to the centre axis of the lever portion.

The bearing leg preferably has an external bearing portion and an internal clamping portion. The bearing portion has a coupling point for coupling the lever to the first housing part. Said coupling point is preferably arranged in such a manner that the swivelling lever is a two-armed lever, wherein a region distally from the coupling point forms a first lever arm and the opposite region proximally from the coupling point forms the second lever arm.

The cam is preferably designed in such a manner that the spring leg edge does not have any sharp edges in the longitudinal direction, in particular runs without an offset (i.e. without discontinuities), and preferably without buckling (i.e. smoothly). This permits improved guidance of the guiding pin along the spring leg edge.

The bearing leg edge preferably comprises a first guiding edge, a mating edge adjoining the first guiding edge and a first receptacle edge adjoining the mating edge.

The first guiding edge and the mating edge are preferably designed in such a manner that a recess is formed between the first guiding edge and the mating edge. Said recess preferably lies opposite the cam at a distance above the receptacle. In other words, the first guiding edge and the mating edge, as they run towards each other, preferably lead increasingly away from the spring leg, i.e. form a depression which preferably runs counter to the coupling point of the swivelling lever. This recess has the advantage that, when the swivelling lever swivels from the locking position into the release position, the guiding pin is provided with space in the receptacle in the region towards the axis of rotation. This facilitates the unlocking. The recess and the cam are formed here in such a manner that the facilitation because of the recess occurs whenever the guiding pin runs onto the cam on the spring leg edge and encounters resistance there. Accordingly, the provision of the recess—or the associated decrease in movement resistance—compensates for the additional movement resistance because of the blocking cam, which cam has to be pushed away by the spring leg springing away during the retracting movement of the guiding pin.

After the guiding pin guided on the bearing leg edge during the unlocking movement has then passed through the depth of the recess between mating edge and first guiding edge in the direction of the main mouth of the receptacle, said guiding pin strikes against the first guiding edge, which runs towards the spring leg and to the main mouth of the receptacle, and is conducted outwards on said edge through the central region of the receptacle. While running on the first guiding edge, which is curved convexly towards the receptacle, the guiding pin moves increasingly away from the axis of the lever, and therefore the two housing parts are guided apart. The bearing leg edge, because of the shape thereof, therefore advantageously cooperates with the guiding pin in order to optimize the effect of the resilience at the cam on the lever and to assist with pushing the housing parts apart. The first guiding edge is therefore advantageously curved convexly into the receptacle, i.e. protrudes centrally with respect to the longitudinal profile of the edge into the receptacle in order to facilitate the guiding apart of the housing parts.

The mating edge is preferably an edge running rectilinearly, i.e. neither convexly nor concavely. The mating edge lies displaced towards the proximal side with respect to the coupling point. Furthermore, the mating edge preferably runs away from a centre axis of the lever portion toward the depth of the receptacle in order to form said recess for the guide pin. The mating edge can run in the distal direction, i.e. towards the centre axis, and can be inclined with respect thereto by about 5° to 15°, in particular 10°. The rectilinear mating edge is substantially of the same length as a diameter of the guiding pin, and in particular is within the range of between 3 millimeters to 10 millimeters, in particular 5 millimeters, in length.

The main mouth preferably lies offset with respect to the axis of the swivelling lever towards the spring leg.

The convex curvature or the slope of the first guiding edge towards the axis of rotation over the course towards the depth of the receptacle also leads to the guiding pin, when the latter strikes against the first guiding edge from the outside and the movement is executed by the housing parts colliding and not by swivelling of the lever, moving the lever from the release position towards the locking position since the first guiding edge is guided along the moving guiding pin. Said swivelling movement of the lever because of moving housing parts is optimized by the sloping shape or the convex shape of the first guiding edge.

The spring leg edge comprises a second guiding edge and a second receptacle edge, wherein the guiding cam is arranged between the second guiding edge and the second receptacle edge. The second guiding edge and the second receptacle edge are both curved concavely, i.e. the receptacle is enlarged in the centre of the edges in the longitudinal profile thereof. The second guiding edge and the second receptacle edge therefore form two arcs which are connected by the cam. The cam here preferably forms a third arc which is arranged in between and points in the other direction than the two above-mentioned arcs of the spring leg edge.

The shape of the spring cam is preferably rounded. A width of the cam along the carrier edge can be 50% to 200% of the radius of the guiding pin. A protrusion height of the cam over the basic profile of the carrier edge can be 50% to 100% of the mentioned width of the cam.

The second receptacle edge preferably has a greater curvature here than the second guiding edge. The guide leg is preferably shaped in such a manner that, during a lever-guided movement of the housing parts (in contrast to the housing-guided movement of the lever), the spring leg contacts the guiding pin by means of the second guiding edge and, as the lever swivels further towards the locking position, pulls the guiding pin towards the first housing. This is achieved by the concave shape of the second guiding edge. The guiding pin is guided as far as the cam, whereupon—when the lever swivels further—the guiding pin is pressed into the depth of the recess—or the head portion is pushed onto the guiding pin—such that the guiding pin has to push the cam outwards in order to enter past the latter into the receiving region of the receptacle. This development is advantageous since, during the locking movement (i.e. the swivelling of the lever from the release position into the locking position), although the housing parts are generally plugged together, they are still a millimeter away from the final closed position. The final section of the plug-in movement can therefore be carried out by means of the assistance of the swivelling of the lever.

The receiving region formed by the first and second receiving edge is advantageously designed in such a manner that the sprung-back cam blocks the guiding pin on the depth side of the spring cam (i.e. in the receiving region). In a preferred development, the receiving region is preferably of at least semicircular design at least in the depth of the receptacle. The receptacle is preferably designed in depth as a partially circular closure, wherein the circular sector has an angle of preferably more than 180°, in particular approximately 180° to 200°. This permits unambiguous locking of the pin in the receiving region by optimum osculation of lever and pin. A tangent at the spring-leg-side end of the circular sector mentioned can run approximately parallel to the centre axis of the lever portion or can taper in the distal direction towards the centre axis, i.e. can be inclined by 1° to 5° with respect to the centre axis. A centre of the receiving region is then located in the circle centre point P of the circular sector.

Furthermore, the pin is advantageously arranged on the second housing part in such a manner that a centre point of the cross-sectional circle of the pin is located displaced by approximately 0.1 millimeter to 0.3 millimeter, preferably approximately 0.2 millimeter, towards the spring leg when the swivelling lever is in the locking position. As a result, the pin bears against the second receiving edge of the spring leg, and the spring leg is slightly deflected when the pin lies behind the cam in the receiving region. This is advantageous because the housing parts are thus pressed together under the action of spring force of the pushing-back spring leg, which brings about an improved seal between the housing parts.

A centre of the receiving region is arranged offset with respect to the centre axis towards the spring leg. As a result, during the unlocking movement out of the receiving region, the guiding pin can be better pushed into the recess between first guiding edge and mating edge.

A centre of the receiving region and an arrangement of the axis of rotation are preferably selected here in such a manner that a swivelling angle of the swivelling lever between the release position and the locking position is 45° to 75°, preferably 50° to 65°, in particular 60°.

The receiving region is preferably designed in such a manner that the springing-back spring leg receives the guiding pin in a play-free manner. This permits unambiguous locking. A radius of a preferably cylindrical guiding pin can be, for example, smaller by 0.1 millimeter to 0.3 millimeter, in particular by 0.1 millimeter, then a radius of a partially circular receiving region.

In a development, the swivelling lever has a spring slot in the depth of the receptacle. The spring slot runs from the proximal end of the receiving region towards or into the neck portion of the lever. The spring slot assists the spring movement of the cam-actuated spring leg. The spring slot can be approximately at the same depth as the receiving region, and in particular can be approximately 20 millimeters long and 2 millimeters high. A person skilled in the art knows to adapt the precise dimensions of the spring slot on the basis of the property of the material.

The spring slot preferably runs substantially along the centre axis of the lever portion.

Furthermore, it is advantageous if an end expansion is arranged in a depth of the spring slot. Said end expansion can be circular, partially circular, elliptical, round or polygonal.

The first and second guiding edges preferably run parallel to each other. In this connection, the first guiding edge is preferably convex and the second guiding edge concave, wherein a radius of curvature of the first guiding edge is preferably greater than a radius of curvature of the second guiding edge.

A distance of the first and second guiding edges from each other is preferably greater than a smallest distance of the cam from the mating edge, which distance can be, for example, approximately 2 millimeters. As a result, the reception in the mouth region is larger than in the receptacle, which facilitates the introduction of the pin.

In a development, the bearing leg protrudes over the spring leg in the distal direction by half the clear width of the mouth opening. The fork-shaped lever head therefore has a bearing-leg overbite. A straight line through distal end points of the bearing leg and of the spring leg is preferably substantially parallel to a connecting straight line through the axis of rotation and a centre of the receiving region. In other embodiments, a length of spring leg and bearing leg is selected in such a manner that a straight line through the distal ends thereof runs at an angle of 30° to 75°, preferably approximately 60°.

The centre of the receiving region is preferably the centre of the osculating circle onto the depth of the receiving region.

A swivelling lever arrangement which comprises two swivelling levers—as described above—is preferred, wherein said two swivelling levers are rigidly connected to each other via a connecting element. The connecting element is in each case fastened to the proximal free end of the swivelling levers and is preferably in the form of a rod element or sheet element. A swivelling lever arrangement consisting of the two swivelling levers and the connecting element is particularly preferred, wherein said lever device is of single-piece design. This permits optimum mechanical strength and is also advantageous in terms of manufacturing since the production is simplified by bending of a semi-finished product.

The swivelling lever arrangement furthermore preferably comprises a locking peg which is arranged on the second housing part at a distance from the guiding pin, wherein the swivelling lever is designed in order to be fastened to said locking peg, preferably by means of a spring connector. For this purpose, the swivelling lever can comprise a recess for receiving the locking peg, wherein the recess is designed in such a manner that the spring connector is guidable by part of the lever and by the locking pin in order to lock the two elements to each other.

In order to secure the swivelling lever in the locking position, a receptacle for a locking peg can be provided on a spring-leg-side outer edge of the lever portion, wherein said peg is attached to the second housing part. The receptacle can have a wall with a through-hole, wherein the peg then preferably also has a through-hole such that the through-holes are aligned when the swivelling lever is in the locking position, and a W-clip can be introduced through the holes in order to secure the lever to the locking peg.

The present invention also relates to a housing arrangement consisting of at least the first and the second housing part, which housing arrangement comprises at least one swivelling lever arrangement according to the invention.

BRIEF DESCRIPTION OF THE DRAWINGS

Preferred embodiments of the invention are described below with reference to the drawings which serve merely for explanation and should not be interpreted as restrictive. In the drawings.

DESCRIPTION OF PREFERRED EMBODIMENTS

Preferred embodiments are now described with reference to FIGS. 1 to 11. The figures show proportionally exact illustrations of preferred embodiments, i.e. said drawings show the subject matter in such a manner that relative proportions for certain embodiments can be read from the drawings.

Figure 1:
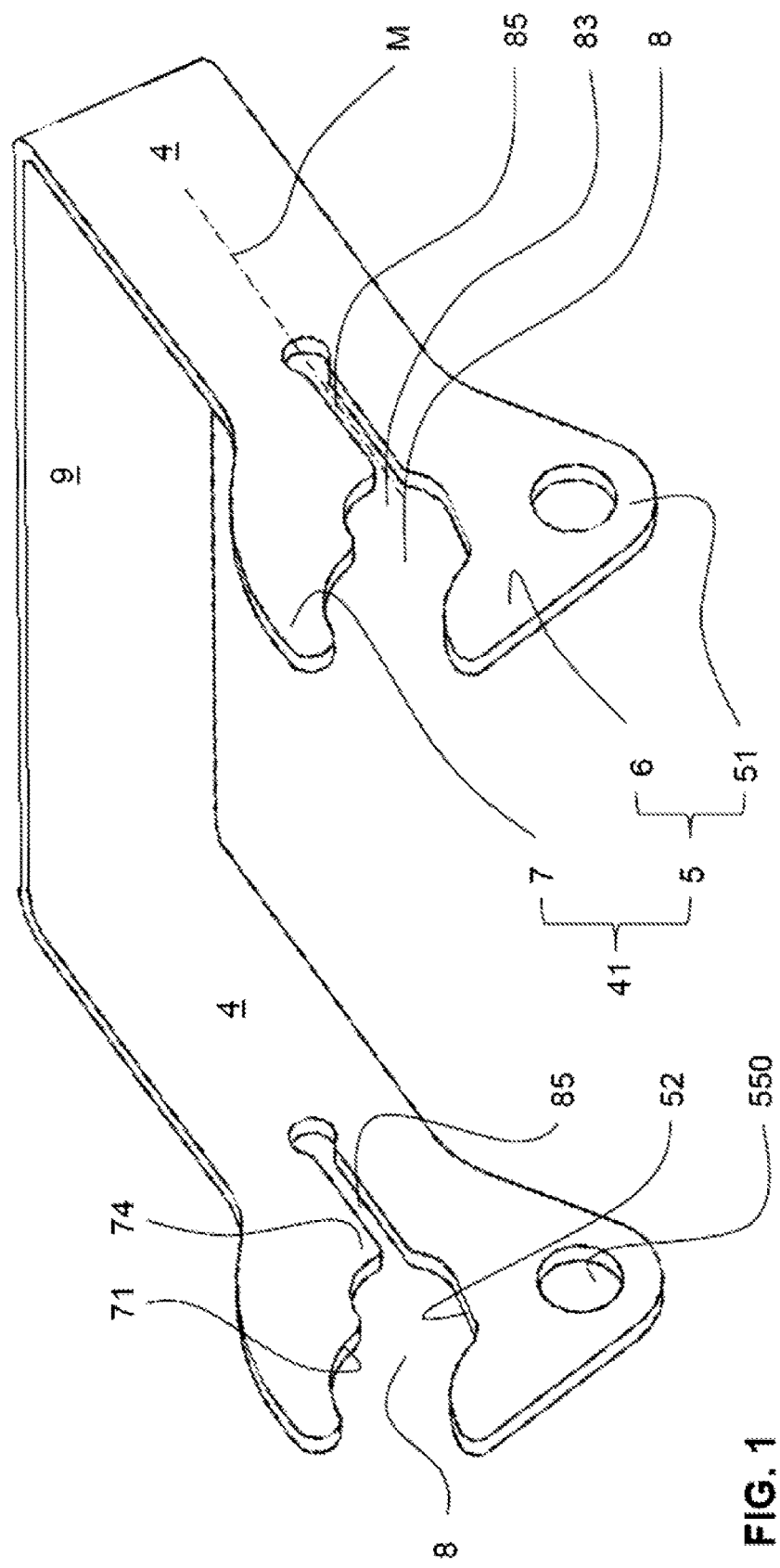
FIG. 1 shows a perspective view of a lever device according to the invention with two swivelling levers, wherein the swivelling levers each have a distal head portion and a proximal end, and wherein the proximal ends are connected rigidly to each other via a connecting element.

FIG. 1 shows a lever device with two swivelling levers 4 of a preferred embodiment of a swivelling lever arrangement according to the invention. The flat swivelling levers 4 are connected to each other via a rigid, flat connecting element 9. The two swivelling levers 4 and the connecting element 9 from a single-piece lever device, namely a substantially U-shaped bow. The swivelling levers 4 form the bow arms, wherein a distal head portion 41 of the swivelling levers 4 is provided at each of the free ends of said bow arms. The swivelling levers 4 running substantially rectilinearly along a centre axis M furthermore comprise a neck portion 43 which adjoins the head portion 41 proximally, and a lever portion 44 with a proximal end 45, which lever portion 44 adjoins the neck portion 43 proximally. In the transition region to the connecting element 9, the proximal ends 45 have bending edges which form a right angle.

The swivelling lever 4 will now be described more precisely.

The distal head portion 41 consists of a spring leg 7 and of a bearing leg 5, which are arranged running substantially parallel to the M axis in such a manner that the swivelling lever 4 is formed in a fork-shaped manner. The spring leg 7 and the bearing leg 5 protrude with free ends 65, 76 in the distal direction. The distal direction is the direction parallel to the M axis from the lever 4 towards the lever head 41.

The bearing leg 5, which is located at the bottom in FIG. 1, has a bearing leg edge 52 which is directed upwards in FIG. 1. The spring leg 7 located at the top has a spring leg edge 71 directed towards the bearing leg edge 52. The two edges 52, 71 bound a receptacle 8 which is formed substantially in two stages in the M direction and has a spring slot 85 in its depth 84. The receptacle 8 runs upwards substantially obliquely to the M direction in FIG. 1 with an angle of inclination in relation to the M axis of 20° to 60°.

A cam 74 which protrudes from the spring leg edge 71 into the recess 8 is attached substantially centrally to the spring leg edge 71.

The bearing leg 5 has an external bearing portion 51 (i.e. located at the bottom in FIG. 1) and an internal clamping portion 6. A recess 550 which is intended for coupling the respective lever 4 to a first housing part 11 (see below) is provided in the bearing portion 51.

A length of the lever from the connecting element 9 as far as the centre point of the recess 550, where the axis of rotation D then comes to lie, is approximately 60 millimeters. A height of the lever head 41 is approximately 35 millimeters, and a height of the lever portion is approximately 18 millimeters.

Figure 2:
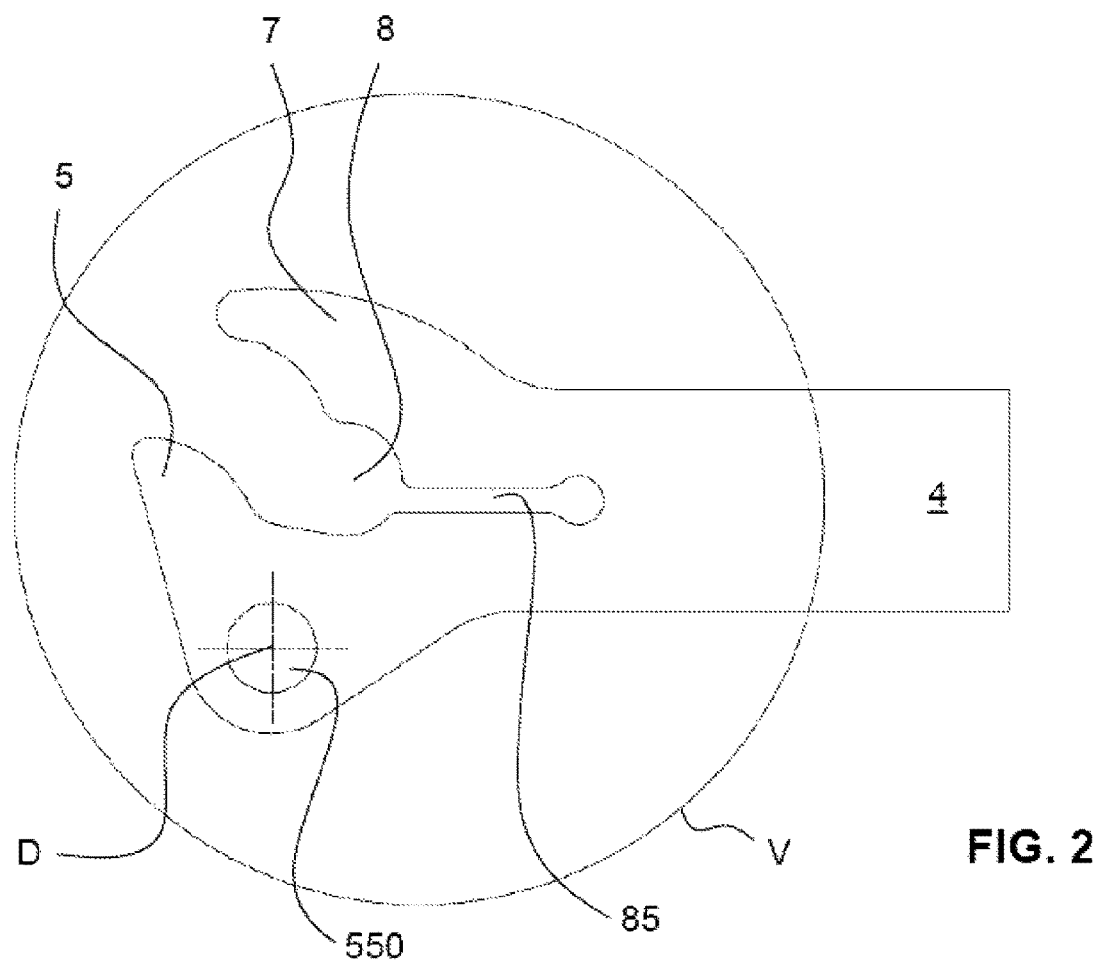
FIG. 2 shows a side view of the device according to FIG. 1.

FIG. 2 shows the arrangement according to FIG. 1 in a side view.

Figure 3:
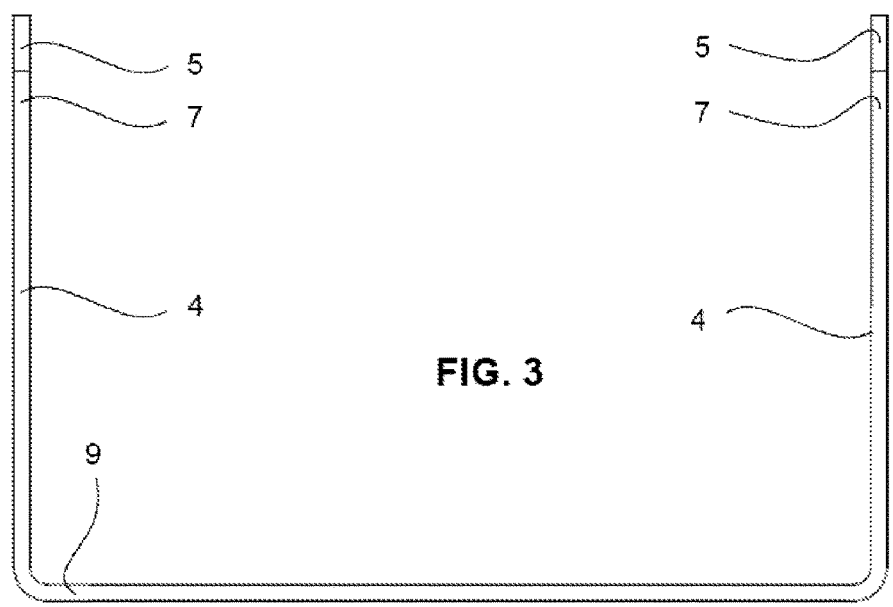
FIG. 3 shows a top view of the device according to FIG. 1.

FIG. 3 shows the arrangement according to FIG. 1 from above. The U shape of the bow comprising the swivelling levers 4 with the bearing leg and the spring leg 5, 7 and the connecting element 9 can be seen. A distance between the swivelling levers 4 is approximately 30% greater than the length of the latter along the M axes thereof.

Figure 4:
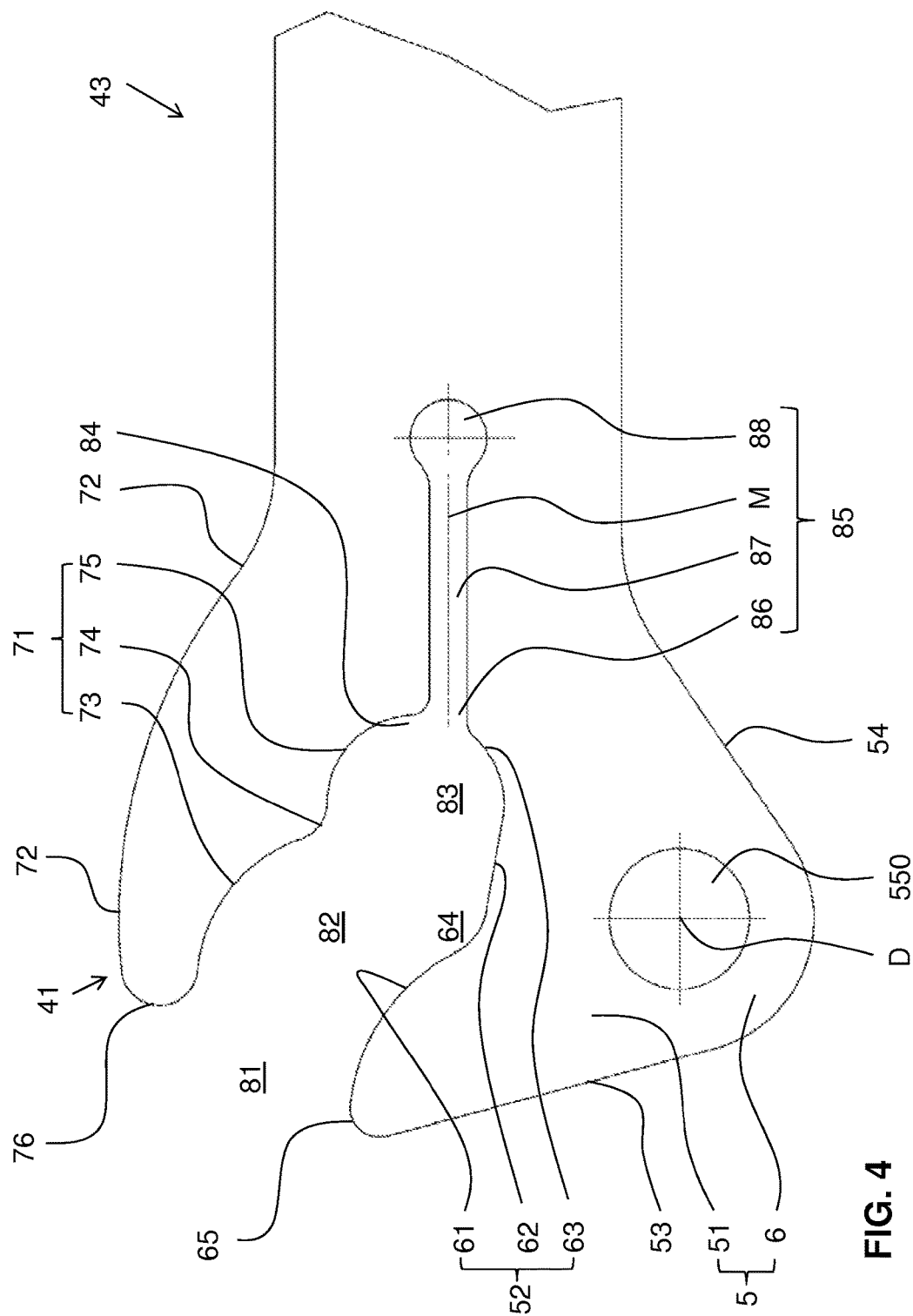
FIG. 4 shows a detail of FIG. 2.

FIG. 4 shows the detail V according to FIG. 2 and illustrates the lever head 41 in enlarged form. The head portion 41, on the left in FIG. 4, merges centrally in FIG. 4 into the neck portion 43 of the lever 4; the neck portion 43 then merges into the lever portion 44. The receptacle 8 has a main mouth region 81 which is located above the M axis (i.e. offset towards the spring leg 7) which is followed in the proximal direction (i.e. towards a depth 84 of the receptacle) by a central region 82, wherein the latter then leads into the receiving region 83. As can be seen in FIG. 4, the receptacle 8 is of substantially two-stage design, wherein the central region 82 forms a first stage and the receiving region 83 forms a second stage, wherein the two stages meet in the region of the cam 74.

The receptacle 8 is bounded downwards in FIG. 4 by the bearing leg edge 52. The bearing leg edge 52 comprises the first guiding edge 61, the mating edge 62 and the first receiving edge 63.

The receptacle 8 is upwardly bounded in FIG. 4 by the spring leg edge 71 of the spring leg 7. The spring leg edge 71 comprises the second guiding edge 73, the cam 74 and the second receiving edge 75. The spring leg 7 is outwardly (i.e. upwardly) bounded by the second outer edge 72 which is rounded convexly outwards.

The first stage of the receptacle 8 is bounded by the first and second guiding edges 61, 73, and the second stage is bounded by the first and second receiving edges 63, 75.

The slot mouth region 86 of the spring slot 85, which slot mouth region is located in the depth 84 of the receptacle 8, is located between the second receiving edge 75 and the first receiving edge 63. The spring slot 85 extends from the slot mouth region 86 along the connecting region 87 parallel to the centre axis M of the lever portion 44 through the distal head portion 41 into the neck portion 43 of the lever 4. An end expansion 88 which is substantially circular with a radius which corresponds to a height of the spring slot 85 in the region of the connecting region 87 is provided at a proximal end of the spring slot 85, i.e. at the depth of the spring slot 85.

The receiving region 83 of the receptacle 8 is bounded by the first receiving edge 63, the second receiving edge 75 and the cam 74, which each—at least in sections—describe circular arcs, and therefore the receiving region 83 is bounded by a partial circle with a sector angle of approximately 180°. It can be seen in FIG. 4 that a centre point P of said partial circle, which can be seen as part of an osculating circle onto the depth 84 of the receptacle 8, is offset upwards (i.e. towards the spring leg 7) with respect to the M axis, specifically approximately by half the radius of the end recess 88.

FIG. 4 furthermore shows that the mating edge 62 is of substantially rectilinear design and extends in a manner inclined in the distal direction at an angle of approximately 10° towards the centre axis M. The first guiding edge 61 which adjoins the mating edge 62 distally is arched convexly outwards (i.e. protrudes into the receptacle 8) and downwardly restricts the recess 8. The mating edge 62 and the first guiding edge 61 are approximately identical in length. The rounded recess 64 is between the mating edge 62 and the first guiding edge 61.

The first guiding edge 61 and a first distal end edge 53 of the bearing leg 5 converge in a rounded end portion, wherein a distal end of said rounded end portion forms the distal end point 65 of the bearing leg 5.

The first proximal end edge 54 lies spaced apart via the axis of rotation D from the first distal end edge 53. The two end edges 53, 54 of the bearing leg 5 converge downwards in FIG. 4, in the region of the bore 550, and are connected to each other via a rounded edge.

A compact swivelling lever arrangement with a swivelling angle between the release position and the locking position of approximately 60° is provided by the embodiment which is described here and is illustrated proportionally exactly in the figures.

Figure 5:
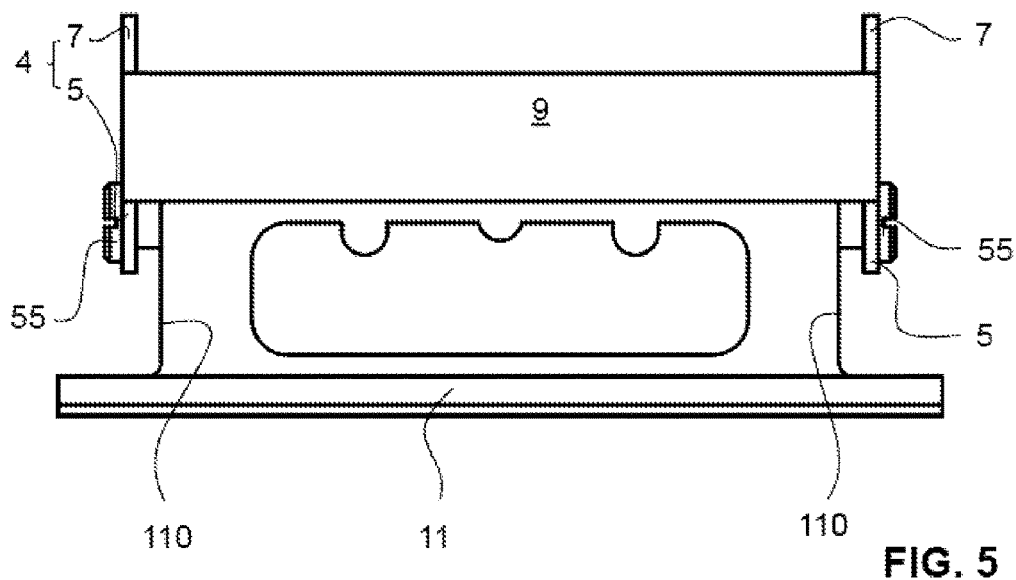
FIG. 5 shows a side view of the subject matter according to FIG. 1 with a first housing part.

FIG. 5 shows, in a side view, the above-described lever arrangement on a first housing part 11. The housing part 11 has side walls 110 to which the respective swivelling levers 4 are coupled via couplings 55.

Figure 6:
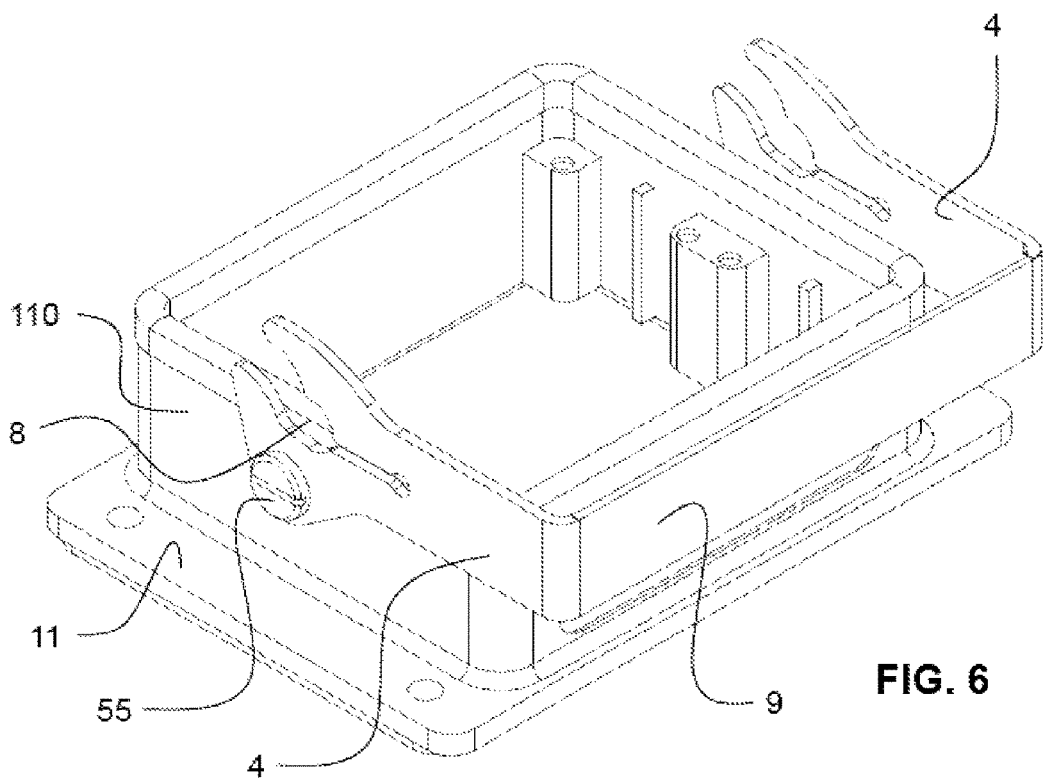
FIG. 6 shows a perspective view of the subject matter according to FIG. 5.

FIG. 6 shows the subject matter according to FIG. 5 in a perspective view.

FIGS. 7 to 10 show the swivelling lever arrangement 3 comprising the double lever 4 with the connecting element 9. FIGS. 7-10 show the first and the second housing part 11, 12, which are already joined together to form the housing arrangement 1. The first housing part has the first side surface 110, and the second housing part 12 has the second side surface 120, wherein the abutting first and second side surfaces 110, 120 lie substantially in the same plane. The swivelling levers 4 are coupled in a swivelling manner to the first side surface 110 via coupling 55; the guiding pin 2 is fastened on the second side surface 120. The swivelling levers 4 are arranged in a diametrically opposed manner behind the arrangement 1 (not visible) and in front of the arrangement 1 (visible). Only the visible front side will be described below, wherein the same description can be applied correspondingly to the configuration of the rear side.

Figures 7, 8:
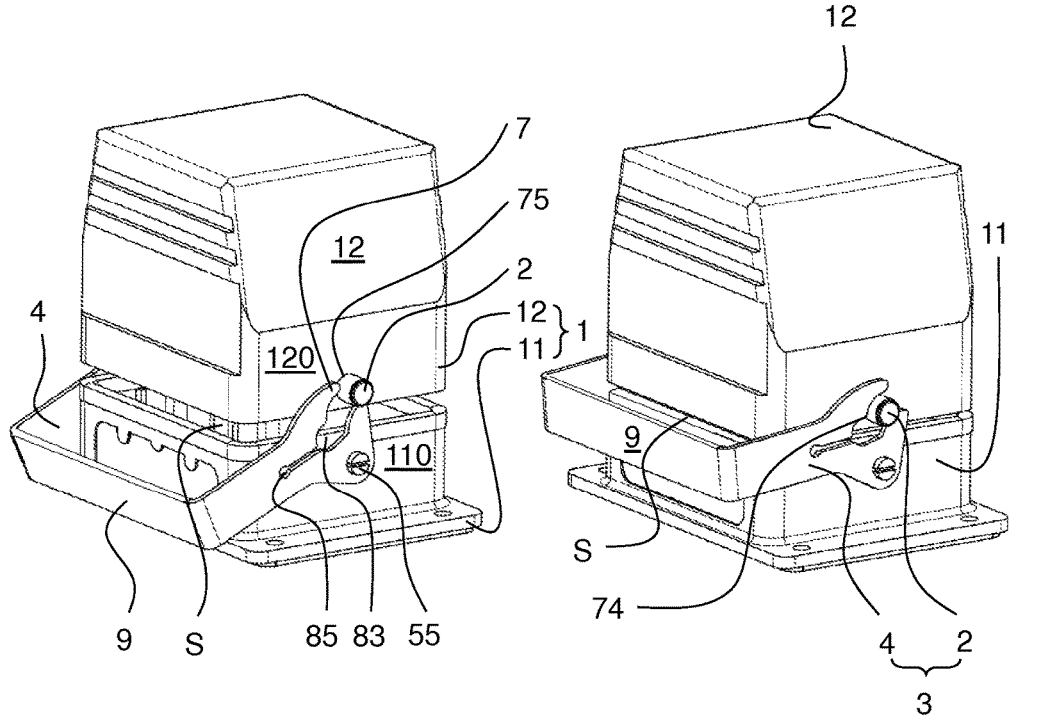
FIG. 7 shows a swivelling lever arrangement according to the invention with a lever device according to FIG. 1 on a first housing part and with guiding pins, corresponding to the swivelling levers, on a second housing part, wherein the lever device is in the released position, and the housing parts lie spaced apart from each other via a gap.
FIG. 8 shows the subject matter according to FIG. 7, wherein the lever device lies between the release position and the locking position, and therefore the swivelling levers are partially swivelled onto the guiding pins, and wherein the gap between the housing parts is smaller than in FIG. 7.

In FIG. 7, the swivelling lever 4 is in the release position. The guiding pin 2 lies in the mouth region 81 of the receptacle 8. The housing parts 11, 12 are still spaced apart via a gap S, i.e. have not yet been completely brought together. In this swivelling position, the spring leg 7 is offset back at the distal end 75 thereof in such a manner that the pin 2 is free counter to the L direction.

The housing parts 11, 12 can essentially move only in the L direction because of the guidance.

In FIG. 8, the swivelling lever 4 is already swivelled from the release position towards the locking position: the guiding pin 2 is contacted by the spring leg edge 71 of the spring leg 7; the pin 2 is located in the central region 82 of the receptacle 8. During further swivelling, the spring leg 7 pulls the pin 2 downwards such that the gap S is reduced in size. Alternatively, the guiding pin 2 can also be contacted by the first guiding edge 61 when the housing parts 11, 12 are pushed together, and the lever 4 is moved as a result.

Figures 9, 10:
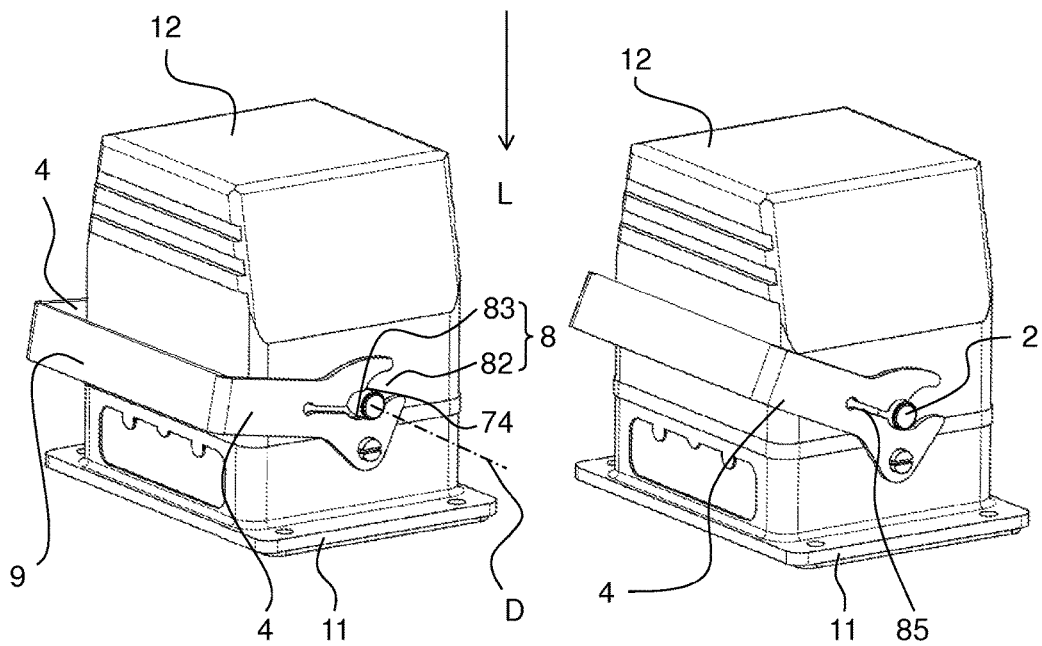
FIG. 9 shows the subject matter according to FIG. 7, wherein the lever device lies between the release position and the locking position such that the swivelling levers are partially swivelled onto the guiding pins, and wherein the housing parts are plugged together and a spring leg of the levers is swivelled via a cam guided on the guiding pins.
FIG. 10 shows the subject matter according to FIG. 10, wherein the lever device is in the locking position such that the swivelling levers are completely swivelled onto the guiding pins, and the guiding pins are blocked behind the cams.

In FIG. 9, the lever 4 has been swivelled upwards (in the clockwise direction), i.e. towards the second housing part 12, and therefore the swivelling lever 4 has been pushed further onto the guiding pin 2. The spring leg 7 engages over the guiding pin 2 from above. The pin 2 contacts the cam 74 and pushes the latter out of the way, with the spring leg 7 springing away, and therefore the pin 2 penetrates more deeply into the receptacle 8. By further swivelling of the lever 4 in the same direction (clockwise direction), the cam 74 is therefore pushed onto the pin 2. The spring leg 7 with the cam 74 is deflected outwards by the torque applied to the lever 4, while the cam 74 is pushed further onto the pin 2, and the pin 2 slides between spring leg edge 71 and the bearing leg edge 52 into the depth 84.

Figure 12:
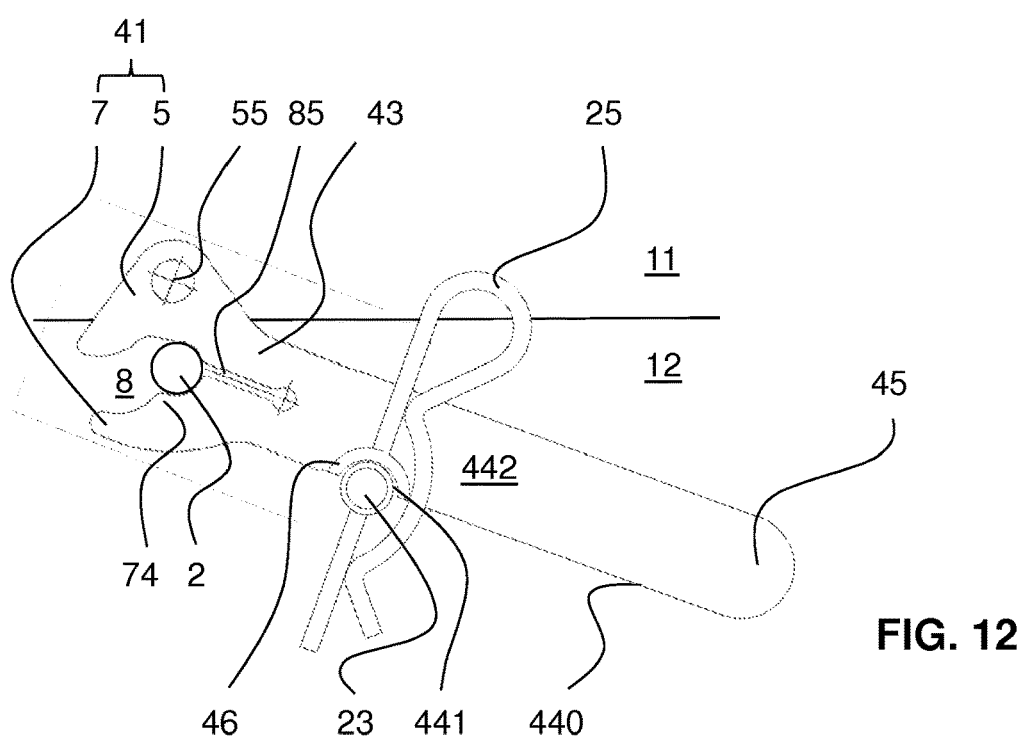
FIG. 12 shows the swivelling lever arrangement according to FIG. 11, wherein a W-clip additionally secures the locking peg, which engages in the corresponding recess of the swivelling lever, and the respective swivelling lever.

In FIG. 10, the pin 2 then passes behind the cam 74 as far as into the depth 84 of the receptacle 8 and is blocked in the receiving region 83 by the cam 74 (also see FIG. 12). Owing to the fact that the pin 2 has been pushed behind the cam 74, and because the receiving region 83 expands behind the cam 74, i.e. in the depth 84, the spring leg 7 can spring back somewhat, which locks the pin 2 in the receiving region 83 behind the cam 74 in a form-fitting manner. Owing to the fact that the pin 2 is slightly offset with respect to the spring leg 7 in the receiving region 83, the spring leg 7 does not completely spring back and continues to push onto the pin 2 from above. The spring gap 85 is therefore slightly expanded, and the spring action pulls the housing parts 11, 12 together, which increases the tightness between the housing parts 11, 12.

If the lever 4 is then swivelled from the locking position according to FIG. 9 back towards the release position, the guiding pin 2 is provided with clearance towards the axis of rotation D by the recess 64, and therefore the bearing leg edge 52 provides only a minimum movement resistance. The torque applied to the lever 4 can thus be advantageously used in order to press the cam 74 outwards again by the spring leg 7 being deflected outwards. After the pin 2 has slipped over the cam 74, the spring leg 7 springs back, and the pin 2 is in the central region 82, wherein, during further swivelling of the lever 4, said pin strikes against the convex first guiding edge 61 which, because of the running direction thereof (with respect to the axis of rotation D), presses said pin away from the axis of rotation D. During said swivelling, the spring leg 7 is deflected back at the distal end 76 thereof to such an extent that the direction counter to the L direction is released for the pin 2. The second housing part 12, which is fixedly connected to the pin 2, is therefore also pressed counter to the L direction; the housing arrangement 1 is undone.

A shape of the first guiding edge 61 is selected here in such a manner that, during the unlocking, the pin 2 is contacted last by the distal end 65 of the bearing leg 5. As a result, the swivelling movement can be optimally used in the final section before the release position in order to assist the moving apart of the housing parts 11, 12. The convex shape of the first guiding edge 61 is selected here in such a manner that the guiding edge 61 substantially runs away from the axis of rotation D in the distal direction. The shape of the bearing leg 5 therefore helps in the separation of the housing parts 11, 12.

Figure 11:
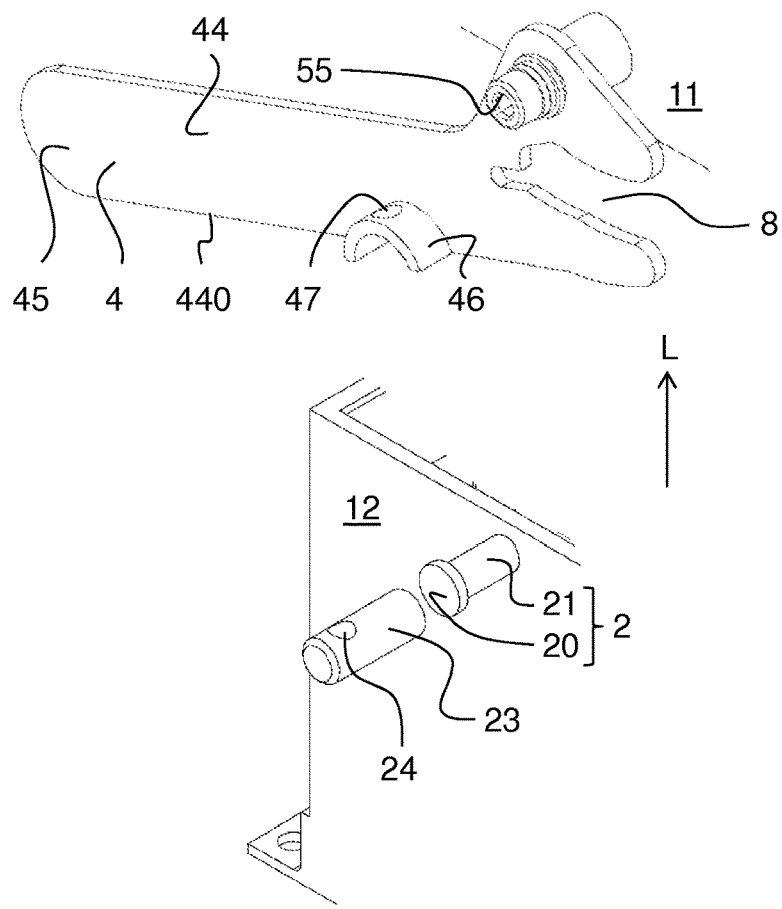
FIG. 11 shows a swivelling lever arrangement according to FIG. 7 with additional positional securing, which positional securing comprises a locking peg on the second housing part and a recess on the swivelling lever.

FIGS. 11 and 12 show a particularly preferred development of the above-described swivelling arrangement. The swivelling lever 4 here can be described as identical to above (although a different recess 8 is shown in FIG. 11 and a different proximal end 45 is shown in FIGS. 11 and 12).

In the development according to FIGS. 11 and 12, an additional securing mechanism is in particular proposed. For this purpose, a recess 441 is provided on a lower edge 440. Said recess, as seen frontally onto a flat side 442 of 44, is in the shape of a circular segment, wherein a partial sleeve 46 protruding vertically from the flat side 442 bounds the recess 441. The recess 441 is provided offset from the centre of the lever 4 towards the head portion 41. The partial sleeve 46 protrudes, here with a circular-arc-shaped cross section, by 3 to 10 millimeters, in particular approximately 5 millimeters, in the D direction over the flat side 442 of 44. A through-bore 47 is provided in the depth of the recess 441—in a manner offset away from the second housing part 12 in the D direction of the flat side 442. A locking peg 23 which protrudes outwards in the D direction and runs at a distance from and parallel to the guiding pin 2 is attached on the first housing part 11.

The peg 23 has a continuous transverse bore 24. Pin 2 and peg 23 are now arranged in such a manner that, in the locking position (according to FIG. 12), the lever 4, which is deflected at the coupling 55, receives the pin 2 in the receptacle 8 between the bearing leg 5 and the spring leg 7 in the receiving region 83 behind the cam 74 with clamping action in the neck portion 43 because of the spring slot 85 and the peg 23 surrounded by the partial sleeve 46 in the lever receptacle 441. The through-bores 47, 24 are then aligned and a spring connector 25 can be guided through the hole 47, 24 to provide the securing as per FIG. 12. Furthermore, the pin 2 according to FIG. 11 has, as a development, an expanded head portion 20 and a bolt 21, and therefore the engagement of the lever 4 outwards in the D direction is secured by a form-fitting connection.

LIST OF REFERENCE SIGNS

| | |
|---|---|
| 1 | Housing arrangement |
| 11 | First housing part |
| 110 | First side wall |
| 12 | Second housing part |
| 120 | Second side wall |
| 2 | Guiding pin |
| 20 | Head of 2 |
| 21 | Neck of 2 |
| 23 | Locking peg |
| 24 | Through-hole |
| 25 | Spring connector |
| 3 | Swivelling lever arrangement |
| 4 | Swivelling lever |
| 41 | Distal head portion of 4 |
| 43 | Neck portion of 4 |
| 44 | Lever portion of 4 |
| 440 | Outer edge of 44 |
| 441 | Recess in 44 on 440 |
| 45 | Proximal end of 4 |
| 46 | Partial sleeve |
| 47 | Through-hole |
| 5 | Bearing leg of 41 |
| 51 | Bearing portion of 5 |
| 52 | Bearing leg edge of 5 |
| 53 | First distal end edge of 5 |
| 54 | First proximal end edge of 5 |
| 55 | Coupling |
| 550 | Recess |
| 6 | Clamping portion |
| 61 | First guiding edge of 6 |
| 62 | Mating edge of 6 |

-continued

LIST OF REFERENCE SIGNS

| | |
|---|---|
| 63 | First receiving edge of 6 |
| 64 | Recess between 61 and 62 |
| 65 | Distal end point of 6 |
| 7 | Spring leg |
| 71 | Spring leg edge of 7 |
| 72 | Outer edge of 7 |
| 73 | Second guiding edge of 7 |
| 74 | Cam of 7 |
| 75 | Second receiving edge of 7 |
| 76 | Distal end point of 7 |
| 8 | Receptacle |
| 81 | Main mouth region of 8 |
| 82 | Central region of 8 |
| 83 | Receiving region |
| 84 | Depth of 8 |
| 85 | Spring slot |
| 86 | Slot mouth region of 85 |
| 87 | Connecting region of 85 |
| 88 | End expansion of 85 |
| 9 | Connecting element |
| D | Axis of rotation |
| L | Connecting movement |
| M | Centre axis of 44 |
| V | Detail |
| S | Gap |

The invention claimed is:

1. A swivelling lever arrangement for securing a housing arrangement consisting of at least one first and one second housing part, which housing parts can be brought together along a connecting movement, wherein the swivelling lever arrangement comprises at least one swivelling lever and a guiding pin, wherein the swivelling lever is couplable in a swivelling manner to the first housing part, and the guiding pin is attachable to the second housing part, wherein the swivelling lever has a lever portion with a proximal end and a distal head portion, wherein the head portion has a receptacle, wherein the swivelling lever and the guiding pin are attachable on the housing parts in such a manner that, when the swivelling lever swivels from a release position into a locking position, the guiding pin is receivable in the receptacle, wherein at least one cam is arranged in the receptacle, which cam is arranged and designed in such a manner that, when the swivelling lever swivels from said release position into said locking position, the guiding pin is guided into a depth of the receptacle and, in the process, is guided via the cam in such a manner that part of the head portion is deflected by the cam, and wherein the head portion has a bearing leg running in the distal direction and a spring leg opposite the bearing leg at a distance therefrom, wherein the bearing leg comprises a recess, and wherein the bearing leg is couplable to the first housing part via a coupling extending through said recess, wherein the receptacle is delimited by a bearing leg edge of the bearing leg and a spring leg edge of the spring leg, and wherein the cam protrudes from the spring leg edge into the receptacle, wherein the bearing leg edge comprises a first receiving edge and the spring leg edge comprises a second receiving edge, the first receiving edge and the second receiving edge forming a receiving region, and wherein the receiving region is designed in such a manner that the guiding pin is received in a play-free manner.

2. The swivelling lever arrangement according to claim 1, wherein the cam runs without an offset along the spring leg edge.

3. The swivelling lever arrangement according to claim 1, wherein the bearing leg edge further comprises a first guiding edge and a mating edge adjoining the first guiding edge, wherein the first receiving edge adjoins the mating edge, which first guiding edge and mating edge are designed in such a manner that a recess is formed between the first guiding edge and the mating edge, which recess lies opposite the cam at a distance above the receptacle.

4. The swivelling lever arrangement according to claim 3, wherein the first guiding edge is curved convexly.

5. The swivelling lever arrangement according to claim 3, wherein the mating edge runs rectilinearly.

6. The swivelling lever arrangement according to claim 3, wherein the first guiding edge is convex and wherein the second guiding edge is concave.

7. The swivelling lever arrangement according to claim 6, wherein the first guiding edge runs away from the axis of rotation in the distal direction.

8. The swivelling lever arrangement according to claim 3, wherein the mating edge runs away from a centre axis of the lever portion toward the depth of the receptacle.

9. The swivelling lever arrangement according to claim 3, wherein the mating edge is at least the same length as a diameter of the guiding pin.

10. The swivelling lever arrangement according to claim 3, wherein a distance of the first and second guiding edges from each other is greater than a smallest distance of the cam from the mating edge.

11. The swivelling lever arrangement according to claim 1, wherein the spring leg edge further comprises a second guiding edge, wherein the guiding cam is arranged between the second guiding edge and the second receiving edge, wherein the second guiding edge and the second receiving edge are both curved concavely.

12. The swivelling lever arrangement according to claim 11, wherein the second receiving edge has a greater curvature than the second guiding edge.

13. The swivelling lever arrangement according to claim 1, wherein the receiving region is designed in such a manner that the sprung-back cam blocks the guiding pin on the depth side of the spring cam.

14. The swivelling lever arrangement according to claim 13, wherein the receiving region is of semicircular design at least in the depth of the receptacle.

15. The swivelling lever arrangement according to claim 13, wherein a centre of the receiving region is arranged offset with respect to the centre axis towards the spring leg.

16. The swivelling lever arrangement according to claim 1, wherein the spring leg being spring-back receives the guiding pin in a form-fitting manner.

17. The swivelling lever arrangement according to claim 16, wherein the spring leg being spring-back receives the guiding pin in a play-free manner.

18. The swivelling lever arrangement according to claim 17, wherein the spring leg and the guiding pin are designed in such a manner that the spring leg being spring-back does not completely spring back and therefore the spring leg pulls together the housing parts resiliently.

19. The swivelling lever arrangement according to claim 1, which swivelling lever arrangement has a spring slot in the depth of the receptacle.

20. The swivelling lever arrangement according to claim 19, wherein the spring slot runs along the centre axis of the lever portion.

21. The swivelling lever arrangement according to claim 20, wherein an end expansion is arranged in a depth of the spring slot.

22. The swivelling lever arrangement according to claim 1, wherein two swivelling levers which are rigidly connected to a connecting element are provided, wherein the connecting element is in each case fastened to the proximal end of the swivelling levers.

23. The swivelling lever arrangement according to claim 22, wherein the device consisting of the swivelling levers and the connecting element is of single-piece design.

24. The swivelling lever arrangement according to claim 1, which swivelling lever arrangement furthermore comprises a locking peg which is arrangeable on the second housing part at a distance from the guiding pin, wherein the swivelling lever is designed in order to be fastened to said locking peg.

25. The swivelling lever arrangement according to claim 24, wherein the swivelling lever is designed in order to be fastened to said locking peg by means of a spring connector.

26. A housing arrangement consisting at least of the first and the second housing part, which housing arrangement comprises at least one swivelling lever arrangement according to claim 1.

27. A swivelling lever arrangement for securing a housing arrangement consisting of at least one first and one second housing part, which housing parts can be brought together along a connecting movement, wherein the swivelling lever arrangement comprises at least one swivelling lever and a guiding pin, wherein the swivelling lever is couplable in a swivelling manner to the first housing part, and the guiding pin is attachable to the second housing part, wherein the swivelling lever has a lever portion with a proximal end and a distal head portion, wherein the head portion has a receptacle, wherein the swivelling lever and the guiding pin are attachable on the housing parts in such a manner that, when the swivelling lever swivels from a release position into a locking position, the guiding pin is receivable in the receptacle, wherein at least one cam is arranged in the receptacle, which cam is arranged and designed in such a manner that, when the swivelling lever swivels from said release position into said locking position, the guiding pin is guided into a depth of the receptacle and, in the process, is guided via the cam in such a manner that part of the head portion is deflected by the cam, wherein the head portion has a bearing leg running in the distal direction and a spring leg opposite the bearing leg at a distance therefrom, wherein the swivelling lever is couplable at the bearing leg to the first housing part, wherein the receptacle is delimited by a bearing leg edge of the bearing leg and a spring leg edge of the spring leg, and wherein the cam protrudes from the spring leg edge into the receptacle, and wherein at least one of:

i) the bearing leg edge comprises a first guiding edge, a mating edge adjoining the first guiding edge and a first receiving edge adjoining the mating edge, which first guiding edge and mating edge are designed in such a manner that a recess is formed between the first guiding edge and the mating edge, which recess lies opposite the cam at a distance above the receptacle in such a manner that, when the swivelling lever swivels from the locking position into the release position, the guiding pin passes through the recess, and ii) the swivelling lever arrangement has a spring slot in the depth of the receptacle, wherein the spring slot extends from the depth of the receptacle and runs along the centre axis of the lever portion.

* * * * *